(12) United States Patent
Welty (10) Patent No.: US 8,775,081 B2
(45) Date of Patent: Jul. 8, 2014

(54) METHOD AND APPARATUS FOR SORTING LIDAR DATA

(75) Inventor: Jeffrey J. Welty, Tacoma, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 533 days.

(21) Appl. No.: 13/245,514

(22) Filed: Sep. 26, 2011

(65) Prior Publication Data

US 2013/0080057 A1    Mar. 28, 2013

(51) Int. Cl.
*G06F 19/00* (2011.01)
*A01G 1/00* (2006.01)

(52) U.S. Cl.
CPC ........................................ *A01G 1/00* (2013.01)
USPC ............................................................ 702/2

(58) Field of Classification Search
CPC ..... A01K 11/008; A01K 29/00; A22B 5/007; A22B 5/201; G01S 17/42
USPC ....................................... 702/2, 182–185, 188
See application file for complete search history.

(56) References Cited

U.S. PATENT DOCUMENTS

| | | | |
|---|---|---|---|
| 7,474,964 B1 | 1/2009 | Welty et al. | |
| 2003/0225546 A1 | 12/2003 | Alfano et al. | |
| 2004/0141170 A1 * | 7/2004 | Jamieson et al. | 356/5.01 |
| 2010/0225531 A1 | 9/2010 | Johnson | |
| 2010/0250482 A1 | 9/2010 | Ma | |
| 2011/0149267 A1 | 6/2011 | Welty et al. | |

FOREIGN PATENT DOCUMENTS

WO       0131290 A2    5/2001

OTHER PUBLICATIONS

Wang, Y. et al., "A Lidar Point Cloud Based Procedure for Vertical Canopy Structure Analysis and 3D Single Tree Modeling in Forest," Sensors, ISSN 1424-8220, www.mdpi.org/sensors, pubished Jun. 12, 2008, http://www.mdpi.org/sensors/papers/s8063938pdf, (14 pgs.).
Stoker, J., "Volumetric Visualization of Multiple-Return Lidar Data: Using Voxels," U.S. Geological Survey, Photogrammetric Engineering & Remote Sensing, Feb. 2009, http://www.asprs.org/a/publications/pers/2009/journal/february/highlight2.pdf, (4 pgs.).

* cited by examiner

*Primary Examiner* — Edward Raymond
(74) *Attorney, Agent, or Firm* — Perkins Coie LLP (57) ABSTRACT

A programmed computer or non-transitory computer readable storage media has instructions that are executable by a processor to identify LiDAR data points associated with items of vegetation or other objects. Each LiDAR data point is tested to determine if it lies within the value of a closed surface defined for higher LiDAR points. If so, the LiDAR point is grouped with the LiDAR points associated with a previously identified item of vegetation. If not, a new item of vegetation is identified.

15 Claims, 6 Drawing Sheets

METHOD AND APPARATUS FOR SORTING LIDAR DATA

TECHNICAL FIELD

The technology disclosed herein relates to remote sensing and in particular to systems for grouping LiDAR data points to identify items of vegetation.

BACKGROUND

As an alternative to physically surveying regions of interest such as a forest tract, etc., many landholders are using remote sensing technology to aid in forest management. Such remote sensing technology can be used to assess the number of trees in a region of interest, as well as estimate their average height, age, market value and other information. One widely used remote sensing technology is light detection and ranging (LiDAR). With LiDAR, an aircraft is flown over a region of interest and a transmitting and sensing unit on the aircraft directs laser pulses towards the ground. The laser pulses that are reflected from vegetation and/or the ground are received by a detecting unit. Because the speed and altitude of the aircraft are known, the round trip time for each pulse provides a 3 dimensional coordinate for each reflected pulse. The coordinates can be combined in a computer to produce a topographical map of the region of interest.

One problem with analyzing LiDAR data is being able to determine which LiDAR data points are associated with individual trees or other items of vegetation in the region of interest. One technique for doing so is disclosed in U.S. Pat. No. 7,474,964 ("'964"), which is herein incorporated by reference. In the '964 patent, digital umbrellas are defined for LiDAR points. Those LiDAR points that are located within an overlapping digital umbrella area of a higher point are presumed to be associated with the same item of vegetation. While the technique described in the '964 patent works well, improvements can be made to individual items of vegetation, e.g., trees or other objects in a region of interest.

DETAILED DESCRIPTION

As will be discussed in further detail below, the technology disclosed herein relates to a method of grouping LiDAR data points to identify items of vegetation or other objects. In one embodiment, the LiDAR data points are associated with a volume bounded by a closed surface. Those LiDAR data points having intersections of their volumes are grouped or associated with a single item of vegetation. Those LiDAR points that do not have intersecting volumes are associated with different items of vegetation. In one embodiment, the closed surface bounding the volume is an ellipsoid. In other embodiments, the closed surface could be a sphere, cylinder, cone or other closed three-dimensional surface depending on, for example, the characteristic shape of the vegetation being analyzed.

Figure 1A:
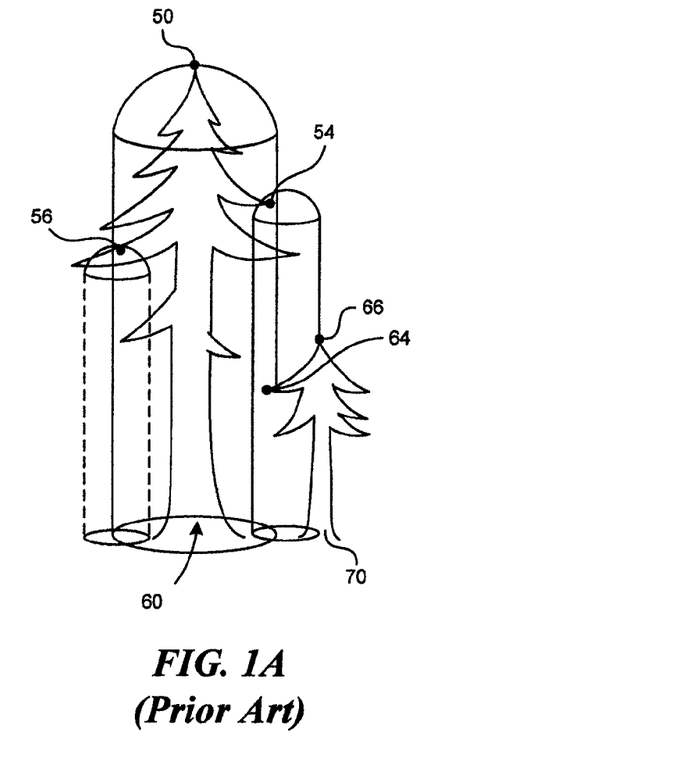
FIGS. 1A and 1B illustrate a known technique for grouping LiDAR data points.
Figure 1B:
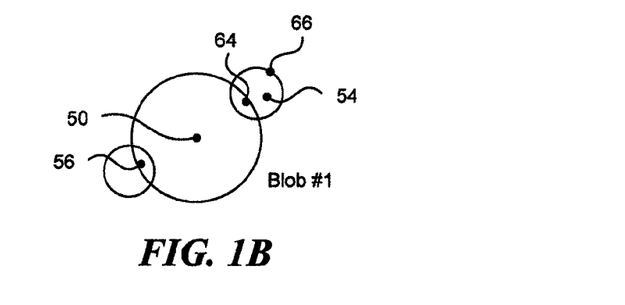

FIGS. 1A and 1B illustrate one known method of grouping LiDAR data points to identify an item of vegetation. As described in U.S. Pat. No. 7,474,964 mentioned above, LiDAR data points 50, 54, 56 represent reflections from a first item of vegetation (e.g., a tree) 60 while LiDAR data points 64 and 66 present reflections from a second tree 70. To calculate the number of trees in an area, digital crown umbrellas are associated with each of the LiDAR data points 50, 54, 56. The dimensions of each umbrella are dependent on the height of the reflected laser pulse and the characteristics of the type of tree that is predominant in the region being analyzed. Any LiDAR data points that are positioned underneath any of these defined digital umbrellas are categorized as belonging to the same item of vegetation. For lack of a better term, a clustered group of LiDAR data points is often referred to as a "blob." As can be seen in FIG. 1A, the LiDAR data points 64, 66 are located underneath the digital umbrella associated with LiDAR point 54. Therefore, these LiDAR data points may be erroneously assumed to be within the same blob despite the fact they are associated with a second tree. By grouping any LiDAR data points below an umbrella as part of the same blob, the number of trees in a given region of interest may be underestimated.

To improve upon the techniques described in the '964 patent, the disclosed technology operates to define a closed surface around each LiDAR data point. The closed surfaces can be egg shaped (e.g., ellipsoids), spheres, cylinders, cones, or other shapes. The particular shape may depend upon the natural shape of the vegetation being sensed within the region of interest or can be selected based on statistics of what shape produces the most accurate results. The closed surface shape can be symmetric or asymmetric. In an alternative embodiment, different closed surfaces may be defined for the LiDAR points such as ellipsoids for the higher points and spheres for the lower points. For purposes of the present disclosure, the closed surfaces are described as being ellipsoids. However, it will be appreciated that the disclosed technology applies to other shapes as well.

Figure 2A:
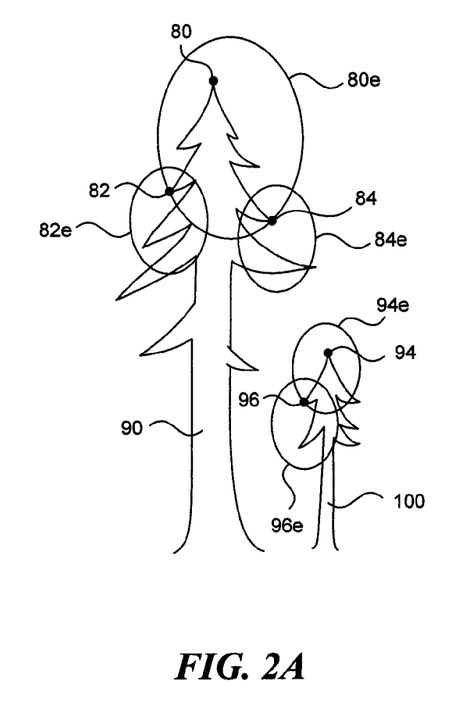
FIGS. 2A and 2B illustrate a technique for grouping LiDAR points in accordance with one embodiment of the disclosed technology.

As seen in FIG. 2A, LiDAR data points 80, 82, 84 are generated by reflections from a single tree 90. Each LiDAR data point is associated with a corresponding ellipsoid 80e, 82e, 84e. In one embodiment, the size of the ellipsoids is dependent upon the height of the corresponding LiDAR data point. Those LiDAR data points that are higher have corresponding larger ellipsoids and conversely those LiDAR points lower to the ground have correspondingly smaller ellipsoids.

In one embodiment, the ellipsoid is not centered around the LiDAR data point but is moved a distance dZ that is dependent on the height of the LiDAR point. In one embodiment, the distance dZ is determined by $dZ = \max(R_i \cdot C_o - C_o, 0)$ where $R_i$ is the radius of the ellipsoid which is selected based on a statistical analysis of ground truth data for the species of tree in question and $C_o$ is a statistical term selected such that there is nearly one tree per blob. As an initial estimate, the value for $C_o$ is selected to be 0.1. The initial radius of the ellipsoids and their stretch and the final value for $C_0$ is determined in an optimization routine that looks at how many trees are identified per blob and then adjusts the parameters of the ellipsoids so that the number of trees per blob is close to 1.

FIG. 2A also shows, LiDAR data points 94, 96 associated with a second tree 100. LiDAR data points 94, 96 are associated with corresponding ellipsoids 94e and 96e. In order to determine whether the LiDAR data points belong to a single item of vegetation or multiple items of vegetation, a computer system determines if either of the ellipsoids associated with each the LiDAR data points intersect or lie within the volume of another ellipsoid. If so, the LiDAR data points are grouped together in a single blob that is associated with a single item of vegetation. If the ellipsoid of a LiDAR data point is not within the volume of a previously defined ellipsoid, then a computer system determines that a new item of vegetation has been found in the LiDAR data and a new blob is defined for that item of vegetation. In the example shown, in FIG. 2A, the ellipsoid 96e associated with LiDAR data point 96 lies within the volume of the ellipsoid 94e associated with LiDAR data point 94. Therefore, LiDAR data points 94 and 96 are grouped together in the same blob that identifies a separate item of vegetation or tree 100.

Figure 2B:
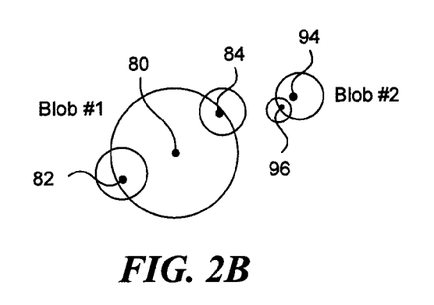

As can be seen in FIG. 2B, when looking down on the LiDAR data points, the LiDAR data points 80, 82, 84 are grouped into a first blob and the LiDAR data points 94, 96 are grouped into a second blob to identify separate items of vegetation. In contrast, as shown in FIG. 1A, the LiDAR data points 50, 54, 56, 64, 66 are grouped into a single blob that only defines a corresponding single item of vegetation.

Figure 3:
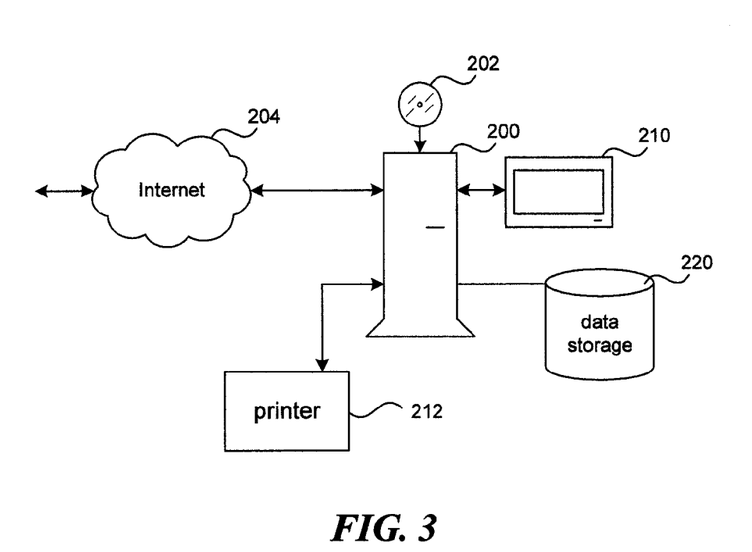
FIG. 3 illustrates one embodiment of a computer system for implementing the disclosed technology.

FIG. 3 illustrates a representative computer system that can be used to implement the disclosed technology. The computer system 200 includes one or more programmable processors (not shown) configured to execute program instructions that are stored on a non-transitory, computer readable media 202 such as a CD, DVD, hard drive, flash drive or are received from a remote source via a computer communication link such as the internet 204.

The computer system operates to execute the program instructions in order to classify LiDAR data into blobs representing individual or closely spaced items of vegetation. The groups of LiDAR data can be combined into a map, which may be shown on a display 210 or can be printed on a physical media with a printer 212. Alternatively, the groups of data can be stored in a computer storage such as database 220, for later review and analysis. Alternatively, the groups of LiDAR data can be transmitted to one or more remotely located computer systems via the computer communication link for review or analysis.

Figure 4:
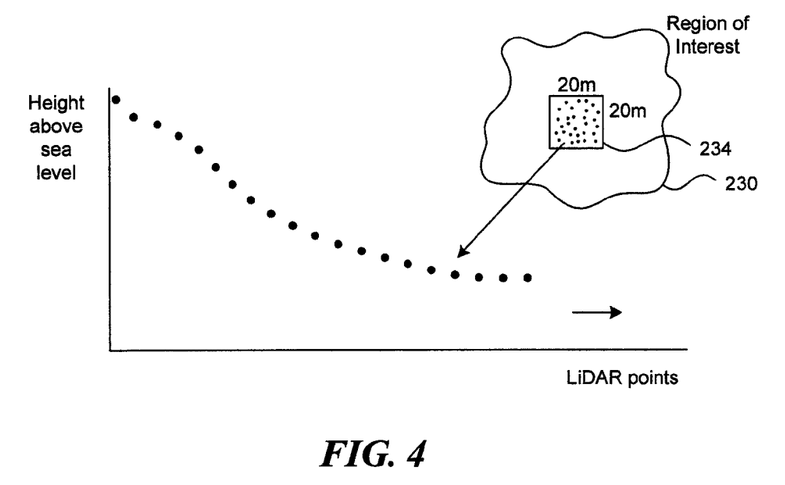
FIG. 4 illustrates a graph showing how a group of LiDAR data points from a region of interest are sorted by height.

In one embodiment, LiDAR data points are grouped into blobs representing individual or closely spaced items of vegetation, by first sorting the LiDAR data points. As shown in FIG. 4, a region 230 of interest such as a forest, may be surveyed and associated with millions of LiDAR data points. The LiDAR data points are stored in a computer readable media and received by the computer system 200 that analyzes the data points to define blobs representing individual or closely spaced items of vegetation. In order to speed processing, the region of interest may be divided into smaller subsections such as areas 234, that are for example, 20×20 or 30×30 meters square. However, it would be appreciated that other sizes could be used depending on the processing power and memory of the computer systems involved.

In one embodiment, each LiDAR data point is associated with an x, y and z coordinate where z represents the height of the reflected LiDAR pulse above sea level. LiDAR data points are first sorted according to their height above sea level starting with the highest point in the set of LiDAR data points to be analyzed as shown in FIG. 4. In one embodiment, it is assumed that the highest LiDAR data point in the set is associated with the top of a tree or other individual item of vegetation. The remaining LiDAR data points in the set are analyzed to determine whether they are within the boundaries of the closed surfaces defined for LiDAR data points in the set that have higher elevations.

Figure 5:
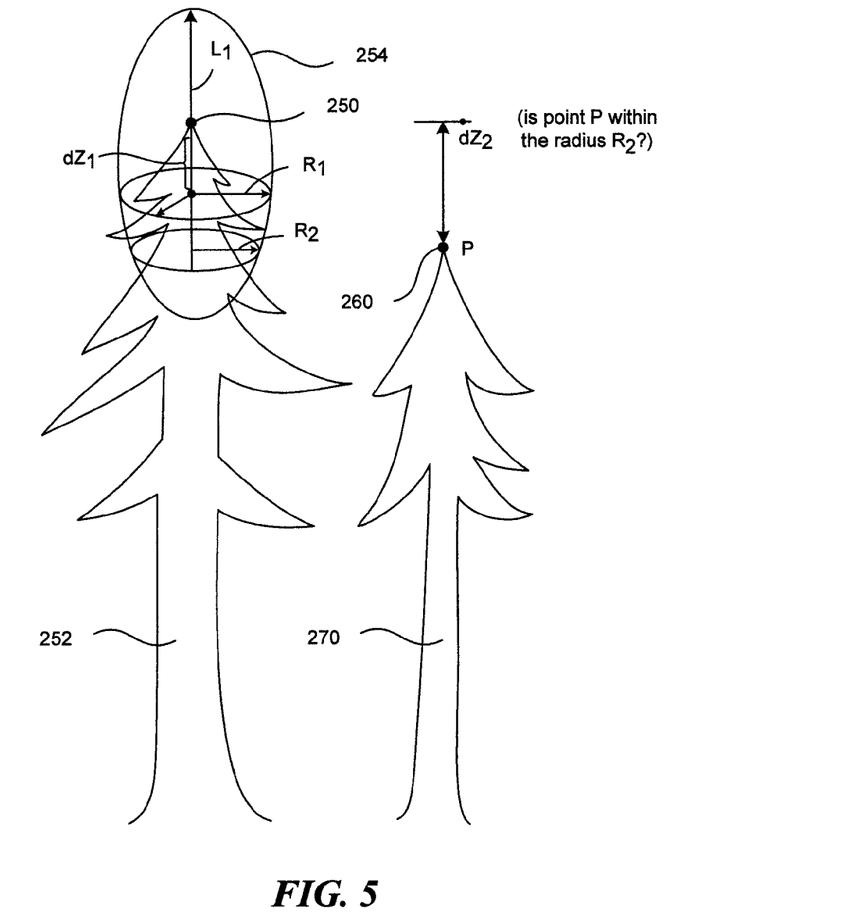
FIG. 5 illustrates one technique for determining if adjacent LiDAR data points belong to the same or different groups that are associated with individual items of vegetation.

FIG. 5 illustrates a LiDAR data point 250 created from a reflection from the top of a tree 252. An ellipsoid 254 is defined for the LiDAR data point 250. The ellipsoid 254 has a size defined by its minor axis and major axis that are dependent upon the height of the LiDAR point 250. The relationship between the height of the LiDAR point and the size of the ellipsoid created can be selected based on a statistical analysis of ground truth data for the particular geographic region of interest or species of vegetation to be imaged. For example, some trees may be tall with small crowns such as Douglas Fir, while other trees may have wider crowns such as deciduous trees, etc. In addition, the size of the ellipsoid created can depend on other factors such as the canopy closure of the forest in question. Canopies having greater closure typically contain trees with smaller crowns. One method of estimating the canopy closure of a region of interest surveyed with LiDAR data is described in published U.S. patent application Ser. No. 12/645,348 ("'348"), which is herein incorporate by reference.

Once the ellipsoid has been created, additional LiDAR points in the data set are compared against the volume encompassed by the ellipsoid. In the example shown, a LiDAR point 260 is identified. To determine whether the LiDAR point 260 represents a new tree or is part of the tree associated with LiDAR point 250 the computer system determines if the coordinates of LiDAR point 260 are within the boundary of the ellipsoid 254. In one embodiment, the computer system determines this by calculating if the x, and y coordinates of the LiDAR point 260 lie within the radius R2 of the ellipsoid 254 taken at the height of the LiDAR point 260. If the x, and y coordinates are within the radius R2, then the LiDAR point 260 is included in the same blob defined for LiDAR point 250. If the x, and y coordinates are not within the radius R2, then the LiDAR point 260 can define a new blob that is associated with another item of vegetation, e.g., tree 270.

As will be appreciated, there are other techniques that could be employed to determine if adjacent LiDAR points should be included in the same blob or grouped in different blobs. For example, ellipsoids could be defined for each LiDAR point and the computer system can determine if the surfaces of the ellipsoids overlap or touch. If so, any LiDAR data points associated with the touching or overlapping ellipsoids are included in the same blob.

Determining if two ellipsoids intersect is a computationally complex operation if done using exact geometric formulas for ellipses, and computing the intersection algebraically from the equations. In one embodiment, it is not necessary to be exact for the purposes of clustering of LiDAR points. The method described below comes very close for testing for intersection when it is known that:

1) The origin of the first ellipse has a larger value of Z (i.e. height) than the second ellipse.
2) Both ellipses are spherical (L=R) or elongated in the Z dimension (L>R)

Figure 7:
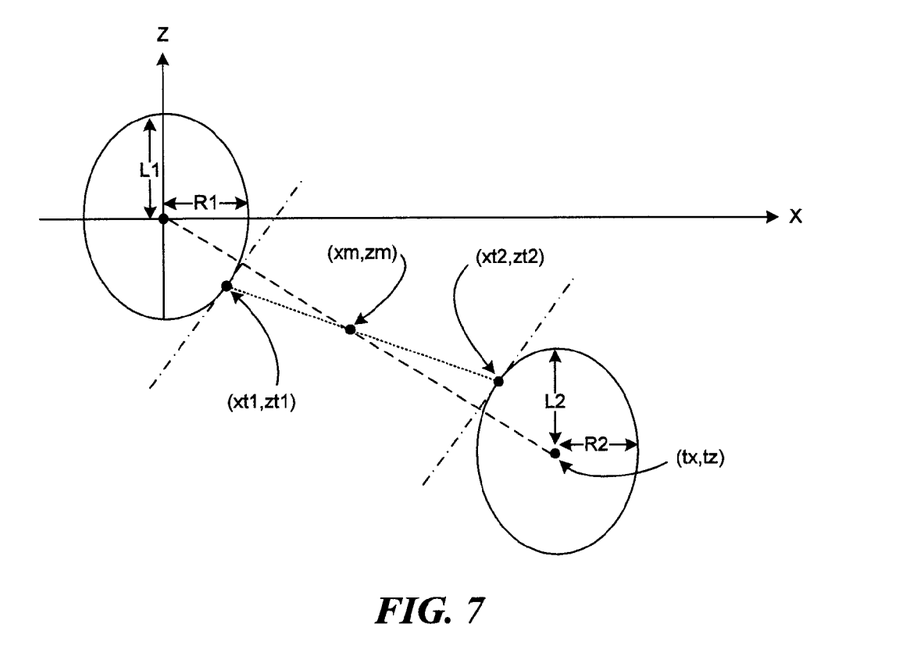
FIG. 7 illustrates one method of determining if LiDAR points associated with two ellipsoids intersect.

In the example shown in FIG. 7, it is assumed the first ellipse is centered on the global origin at x=0,z=0. The origin of the second ellipse is at (tx,tz). The radius, and length of the first ellipse are designated (R1,L1). The radius, and length of the second ellipse are designated (R2,L2).

To determine if the ellipses overlap
1) The value t=tx/tz is computed. In geometric terms this is 1/(slope of line connection the origins of the 2 ellipses).
2) The point on the first ellipse, where the slope of a line parallel to the ellipse is equal to t is determined. First the necessary value of x is found using the first derivative of the equation for an ellipse and solving for x where the slope=t:

$$xt1 = \sqrt{\frac{R1^2}{\frac{L1^2}{t^2 * R1^2} + 1}}$$

And the corresponding value for z is determined:

$$zt1 = -\sqrt{\left(L1^2 * \left(1 - \frac{xt1^2}{R1^2}\right)\right)}$$

Similarly, the value of xt2,zt2 is computed for the second ellipse:

$$xt2 = tx - \sqrt{\frac{R2^2}{\frac{L2^2}{t^2 * R2^2} + 1}}$$

$$zt2 = tz + \sqrt{\left(L2^2 * \left(1 - \frac{xt2^2}{R2^2}\right)\right)}$$

If two points on the two different ellipses were touching at exact point on the ellipses they would make contact at exactly one place. But the two ellipses are not necessarily touching. These two points, and the line segment that connects them gives a bound for an intermediate point that can be tested for inclusion in the first ellipse.

3) Next the intermediate points as a weighted mean of the two points (xt1,zt1) and (xt2,zt2) are computed. If L1/R1>L2/R2 then the weight for the second point is:

$$w2 = .5 - .5 * \frac{\left(\frac{\frac{L1}{R1} - \frac{L2}{R2}}{\frac{L1}{R1} + \frac{L2}{R2}}\right)^2}{t}$$

Otherwise $$w2 = .5 + .5 * \frac{\left(\frac{\frac{L2}{R2} - \frac{L1}{R1}}{\frac{L1}{R1} + \frac{L2}{R2}}\right)^2}{t}$$

4) The value of w1 is then computed by:

$w1=1-w2$

5) Next, the weighted midpoint (xm,zm) is computed by:

$xm=w1*xt1+w2*xt2$ $zm=w1*zt1+w2*zt2$

6) Finally, the weighted midpoint (xm,zm) is tested to see if it is contained in the first ellipse by determining if:

$$\frac{xm^2}{R1^2} + \frac{zm^2}{L1^2} < 1$$

If so, then the midpoint is inside the first ellipse, and in most cases the second ellipse intersects the first ellipse. This procedure is much more computationally efficient and trades off some precision on the boundary cases where the second ellipse is just outside, or just inside of the first ellipse. The actual amount of precision loss has not been determined, only a visual examination of the performance of the procedure has been examined with a large number of randomly generated ellipses.

Figure 6:
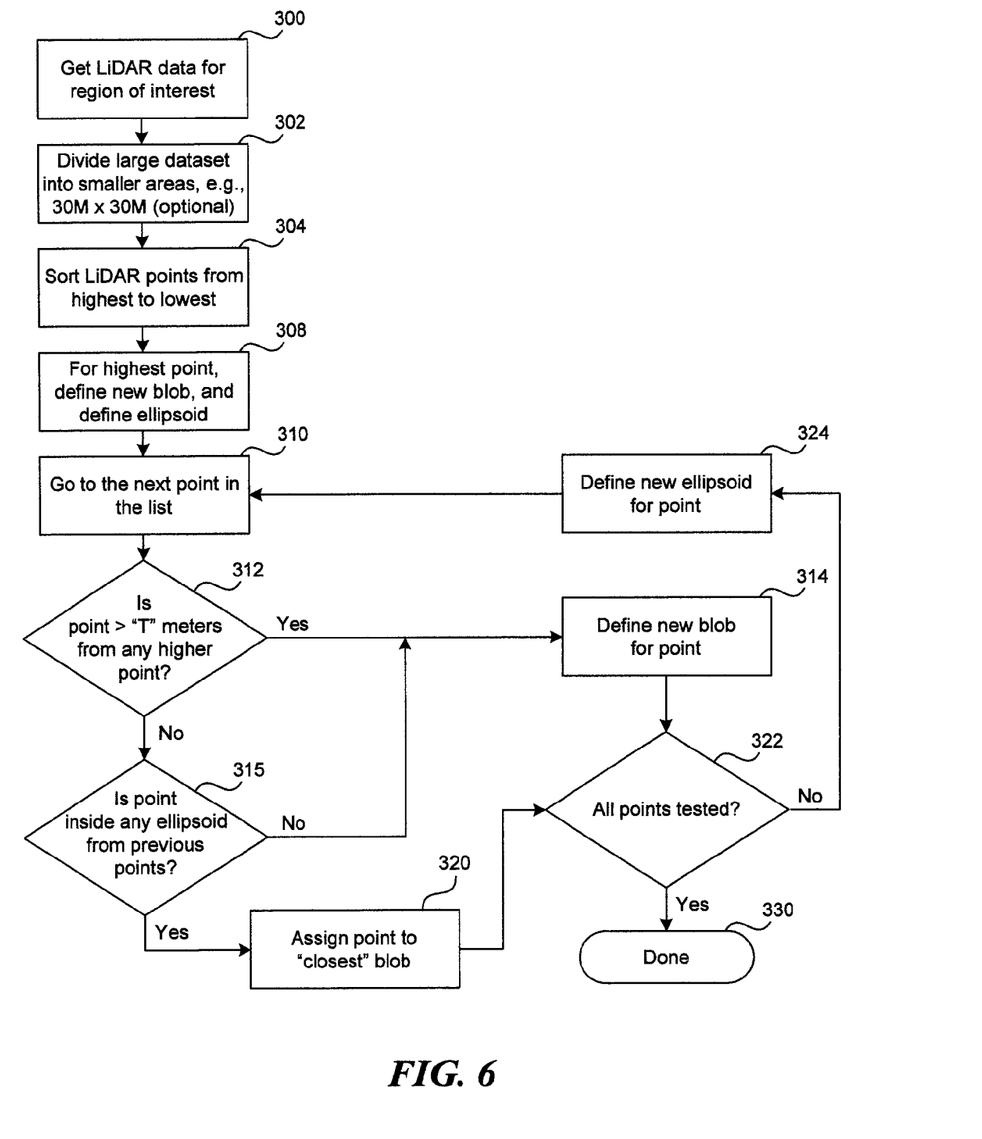
FIG. 6 is a flow diagram of steps performed by a computer system to group LiDAR data points in accordance with one embodiment of the disclosed technology.

FIG. 6 illustrates a series of steps performed by a computer system in accordance with one embodiment of the disclosed technology to group LiDAR data points associated with individual or closely spaced items of vegetation.

Beginning at 300, a computer system obtains or receives LiDAR data for a region of interest. At 302, the computer system divides the LiDAR data into smaller sections or sets, such as sets covering 20×20 or 30×30 square meters. This step may be optional depending upon the computing power and memory available in the computer system, if multiple processors are used, etc. At 304, the computer system sorts the LiDAR data. In one embodiment, the LiDAR data in the set is sorted from highest elevation to lowest elevation. At 308, the computer system defines an ellipsoid or other closed surface shape for the highest LiDAR data point in the set. In accordance with the one embodiment, the highest LiDAR data point defines a tree top and other LiDAR data points are compared to that tree top.

At 310, the computer system begins a loop that analyzes the remaining LiDAR data points in the set. At 312, the computer system determines if a LiDAR point is more than a predefined number of meters "T" away from all remaining higher points. If so, the LiDAR data point is determined to be a new item of vegetation and a new blob is defined for that point at 314. In one embodiment, if "T" is five meters and the three-dimensional distance between a LiDAR data point and its neighbors is determined to be more than five meters, then the LiDAR data point is assumed to represent a new item of vegetation. However, it will be appreciated that the particular value of "T" used can depend upon the statistical analysis of ground truth data or other factors or may be adjusted by the user of the computer system.

If the LiDAR data point is not more than the predefined distance "T" away from the neighboring LiDAR data points, the computer system determines at 315 if the LiDAR data point is within the ellipsoid of any previously analyzed (e.g., higher) LiDAR data points. If so, the LiDAR point in question is assigned to the closest blob at 320.

In one embodiment, a calculation is performed to determine which ellipsoids associated with a blob are closest to the LiDAR point in question. The closest blob can be determined based on distance. Alternatively, the closest blob it can be determined based on the number of ellipsoids within a blob that are closer to the LiDAR point in question. Processing then proceeds to step 322 wherein it is determined if all the LiDAR data points in the set have been tested. If not, an ellipsoid is defined for the LiDAR point in question at 324 and processing returns to step 310 for the next LiDAR point in the set as indicated above. Once all the LiDAR points in the set have been analyzed, processing ends at 330.

As will be appreciated from the above, the disclosed technology operates to improve the ability of the computer system to group LiDAR data points into sets or blobs that represent items of vegetation. By defining a closed surface around each LiDAR data point, a better determination can be made as to whether lower LiDAR data points are part of the same blob or represent separate items of vegetation.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a non-transitory computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include, a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

From the foregoing, it will be appreciated that specific embodiments of the invention have been described herein for purposes of illustration, but that various modifications may be made without deviating from the scope of the invention. For example, although the technology is described with respect to identifying trees in a region of interest, it will be appreciated that the techniques disclosed can be applied to other objects of interest. Accordingly, the invention is not limited except as by the appended claims and equivalents thereof.

I claim:

1. A computer-implemented method of sorting LiDAR data into groups, comprising:
   receiving a set LiDAR data points for a region of interest;
   analyzing each of the LiDAR data points in the set to determine if a LiDAR data point has a position that is within an enclosed surface defined for one or more other LiDAR data points in the set and,
      if so, adding the LiDAR data point to a previously defined group of LiDAR data points associated with an object; and
      if not, defining a new group of LiDAR data points associated with a new object.

2. The method of claim 1, wherein the object is a tree in a forest.

3. The method of claim 1, wherein the enclosed surface is an ellipsoid.

4. The method of claim 1, wherein the enclosed surface is a sphere.

5. The method of claim 1, wherein the enclosed surface is a cone.

6. The method of claim 1, wherein the enclosed surface is a cylinder.

7. The method of claim 3, wherein the determination of whether a LiDAR data point is within the enclosed surface is made by determining if the coordinates of the LiDAR data point analyzed are within a radius of an ellipsoid taken at the height of the LiDAR data point being analyzed.

8. The method of claim 1, wherein the enclosed surface defined for each LiDAR data point has a size that is dependent on the height of the LiDAR data point.

9. The method of claim 2, wherein the enclosed surface defined for each LiDAR data point has a size that is dependent on a canopy closure value from which the LiDAR data was obtained.

10. A computer-implemented method of identifying LiDAR data points associated with individual trees in a forest, comprising:
    receiving a set of LiDAR data points for a region of interest;
    sorting the LiDAR data points based on a height of each LiDAR data point in the set;
    defining a closed surface for each of the LiDAR data points in the set; and
    defining a group of LiDAR data points that have overlapping closed surfaces as representing an individual tree.

11. The computer-implemented method of claim 10, wherein the closed surface is defined by an ellipsoid.

12. The computer-implemented method of claim 10, wherein the closed surface is defined by a sphere.

13. The computer-implemented method of claim 10, wherein the closed surface is defined by a cone.

14. The computer-implemented method of claim 10, wherein the closed surface is defined by a cylinder.

15. A non-transitory computer readable media with instructions stored thereon that are executable by a computer to identify LiDAR data points associated with an item of vegetation, wherein the instructions caused a processor to:
    receive a set LiDAR data points for a region of interest;
    analyze each of the LiDAR data points in the set to determine if a LiDAR data point has a position that is within an enclosed surface defined for one or more other LiDAR data points in the set and
       if so, to add the LiDAR data point to a previously defined group of LiDAR data points associated with an item of vegetation; and
       if not, to define a new group of LiDAR data points associated with a new item of vegetation.

* * * * *